United States Patent
Li et al.

(10) Patent No.: US 9,626,026 B2
(45) Date of Patent: Apr. 18, 2017

(54) GRATING SUBSTRATE AND FABRICATION METHOD THEREOF, DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventors: Hongwei Li, Beijing (CN); Fan Li, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 23 days.

(21) Appl. No.: 14/443,508

(22) PCT Filed: Oct. 11, 2014

(86) PCT No.: PCT/CN2014/088359
§ 371 (c)(1),
(2) Date: May 18, 2015

(87) PCT Pub. No.: WO2015/188539
PCT Pub. Date: Dec. 17, 2015

(65) Prior Publication Data
US 2016/0291742 A1    Oct. 6, 2016

(30) Foreign Application Priority Data

Jun. 9, 2014  (CN) .......................... 2014 1 0253654

(51) Int. Cl.
*G06F 3/041*    (2006.01)
*G02F 1/1343*    (2006.01)
(Continued)

(52) U.S. Cl.
CPC ......... *G06F 3/0412* (2013.01); *G02B 5/1857* (2013.01); *G02B 27/1086* (2013.01);
(Continued)

(58) Field of Classification Search
CPC . G06F 2203/04103; G06F 2203/04111; G06F 3/044; G02F 1/13338
See application file for complete search history.

(56) References Cited

U.S. PATENT DOCUMENTS

2003/0011577 A1    1/2003  Katsuki et al.
2013/0057497 A1*   3/2013  Cho ........................ G06F 3/044
                                                                345/173
(Continued)

FOREIGN PATENT DOCUMENTS

CN    102830555 A    12/2012
CN    103049156 A     4/2013
(Continued)

OTHER PUBLICATIONS

International Search Report mailed Apr. 3, 2015; PCT/CN2014/088359.
(Continued)

*Primary Examiner* — Gerald Johnson
(74) *Attorney, Agent, or Firm* — Ladas & Parry LLP

(57) ABSTRACT

A fabrication method of a grating substrate, a grating substrate and a display device are provided. The fabrication method of the grating substrate, comprises: forming an array of comb-shaped, opaque touch electrodes and a plurality of first conductive bridges (3) on a base substrate, wherein the array of touch electrodes includes a plurality of first touch electrodes (1) and a plurality of second touch electrodes (2) which are disconnected from each other, and the plurality of first touch electrodes (1) in the array are connected together via the first conductive bridges (3); forming an insulating
(Continued)

spacing layer (4) on the base substrate on which the array of touch electrodes and the plurality of first touch electrodes (1) are formed, the insulating spacing layer (4) covering the first conductive bridges (3); forming second conductive bridges (5) on the insulating spacing layer (4), the plurality of second touch electrodes (2) in the array being connected together via the second conductive bridges (5). In embodiments of the present invention, the touch electrode can be used as not only a touch electrode of a touch screen but also an electrode of a 3D grating, to achieve both a touch function and a 3D light-splitting function at the same time.

17 Claims, 3 Drawing Sheets

(51) Int. Cl.
G02B 27/26 (2006.01)
G02B 5/18 (2006.01)
G02B 27/10 (2006.01)
G02B 27/22 (2006.01)
G06F 3/044 (2006.01)

(52) U.S. Cl.
CPC ......... *G02B 27/2214* (2013.01); *G02B 27/26* (2013.01); *G02F 1/1343* (2013.01); *G06F 3/044* (2013.01); *G06F 2203/04103* (2013.01); *G06F 2203/04111* (2013.01)

(56) References Cited

U.S. PATENT DOCUMENTS

| | | |
|---|---|---|
| 2013/0308067 A1 | 11/2013 | Hashimoto |
| 2014/0152921 A1* | 6/2014 | Yashiro .................. G06F 3/044 349/12 |
| 2014/0168154 A1 | 6/2014 | Wang et al. |
| 2015/0185910 A1 | 7/2015 | Zhang et al. |
| 2015/0277639 A1 | 10/2015 | Li |

FOREIGN PATENT DOCUMENTS

| | | |
|---|---|---|
| CN | 103116233 A | 5/2013 |
| CN | 103149749 A | 6/2013 |
| CN | 203133450 U | 8/2013 |
| CN | 103293778 A | 9/2013 |
| CN | 103309094 A | 9/2013 |
| CN | 103698926 A | 4/2014 |
| CN | 103941912 A | 7/2014 |
| TW | 201348798 A | 12/2013 |

OTHER PUBLICATIONS

Written Opinion of the International Searching Authority mailed Mar. 4, 2015; PCT/CN2014/088359.
First Chinese Office Action dated Aug. 1, 2016; Appln. No. 201410253654.5.

* cited by examiner

GRATING SUBSTRATE AND FABRICATION METHOD THEREOF, DISPLAY DEVICE

TECHNICAL FIELD

Embodiments of the invention relate to a grating substrate, a fabrication method thereof and a display device.

BACKGROUND

A touch screen is the most simple, convenient and natural way of man-machine interaction at present. In the touch screen, a number of first touch electrodes and a number of second touch electrodes in an array are formed to connect different signals so as to detect a touch point.

A parallax barrier 3D display technology is a kind of naked-eye type 3D display technologies without wearing a 3D glasses, and its main structure includes: a display and a slit grating arranged on a light emitting side of the display. By using the slit grating, it can realize that a left-eye image will only enter into a viewer's left eye and a right-eye image will only enter into the viewer's right eye, thereby achieving the 3D display. Currently, there is a need for a touch 3D slit grating integrating the touch function and the 3D light-splitting function.

SUMMARY OF THE INVENTION

Embodiments of the present invention provide a grating substrate and a fabrication method thereof, and a display device, which can achieve both a touch function and a 3D light-splitting function at the same time.

In one aspect, an embodiment of the present invention provides a fabrication method of a grating substrate, comprising: forming an array of comb-shaped, opaque touch electrodes and a plurality of first conductive bridges on a base substrate, wherein the array of touch electrodes comprises a plurality of first touch electrodes and a plurality of second touch electrodes which are disconnected from each other, and the plurality of first touch electrodes in the array are connected to each other by the first conductive bridges; forming an insulating spacing layer on the base substrate on which the array of the touch electrodes and the plurality of first conductive bridges are formed, the insulating spacing layer covering the first conductive bridges; and forming second conductive bridges on the insulating spacing layer, the plurality of second touch electrodes in the array being connected to each other by the second conductive bridges.

In another aspect, an embodiment of the present invention further provides a fabrication method of a grating substrate, comprising: forming second conductive bridges on predetermined positions on a base substrate; forming an insulating spacing layer on the base substrate on which the second conductive bridges are formed, to make the insulating spacing layer cover the second conductive bridges; forming an array of comb-shaped, opaque touch electrodes and a plurality of first conductive bridges on the base substrate on which the second conductive bridges and the insulating spacing layer are formed, wherein the array of touch electrodes comprises a plurality of first touch electrodes and a plurality of second touch electrodes which are disconnected from each other, and the plurality of first touch electrodes in the array are connected to each other by the first conductive bridges, while the plurality of second touch electrodes in the array are connected to each other by the second conductive bridges, and the insulating spacing layer is arranged between the first conductive bridges and the second conductive bridges.

In still another aspect, an embodiment of the present invention further provides a grating substrate, comprising: a plurality of first conductive bridges, a plurality of comb-shaped, opaque first touch electrodes, and a plurality of comb-shaped, opaque second touch electrodes, formed in a same layer on a base substrate; a plurality of second conductive bridges, configured to connect the plurality of second touch electrodes, wherein the plurality of first touch electrodes are not connected to the plurality of second touch electrodes, the plurality of first conductive bridges are configured to connect the plurality of first touch electrodes, and an insulating spacing layer is arranged between the first conductive bridges and the second conductive bridges.

In yet another aspect, an embodiment of the present invention further provides a display device, comprising the grating substrate described above.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DESCRIPTION OF THE EMBODIMENTS

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Hereinafter, embodiments of the present invention will be further illustrated in detail in conjunction with the accompanying drawings. The following embodiments are not to limit the scope of the embodiments of the invention.

A First Embodiment

A fabrication method of a grating substrate provided by the present embodiment comprises steps of:

Step 1: forming an array of comb-shaped, opaque touch electrodes and a first conductive bridge on a base substrate, wherein the array of touch electrodes includes a plurality of first touch electrodes and a plurality of second touch electrodes which are disconnected from each other, and each of the plurality of first touch electrodes and the plurality of second touch electrodes is comb-shaped and opaque; and the first touch electrodes in the array are connected via the first conductive bridge.

Step 2: forming an insulating spacing layer on the base substrate on which the array of the touch electrodes and the plurality of first conductive bridges are formed, to cover the first conductive bridge.

Step 3: forming a second conductive bridge on the insulating spacing layer, the second conductive bridge connecting the second touch electrodes to each other in the array.

Therein, the opaque touch electrode may be a metal electrode.

In the embodiment of the present invention, the touch electrode is made to be an opaque comb-shaped electrode, so that the touch electrode can be used as not only a touch electrode of a touch screen but also an electrode of a 3D slit grating, so as to achieve both a touch function and a 3D light-splitting function at the same time.

Figure 1:
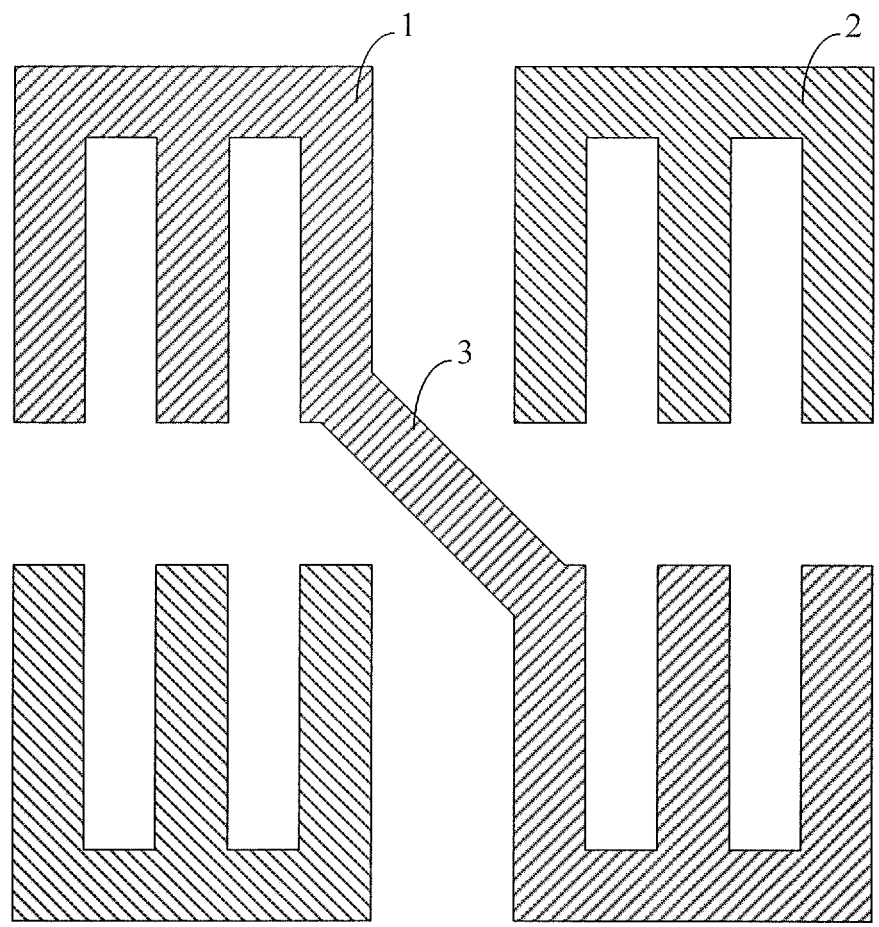
FIG. 1 is a structural schematic diagram of forming a touch electrode and a first conductive bridge in a fabrication method of a grating substrate provided by an embodiment of the invention.
Figure 2:
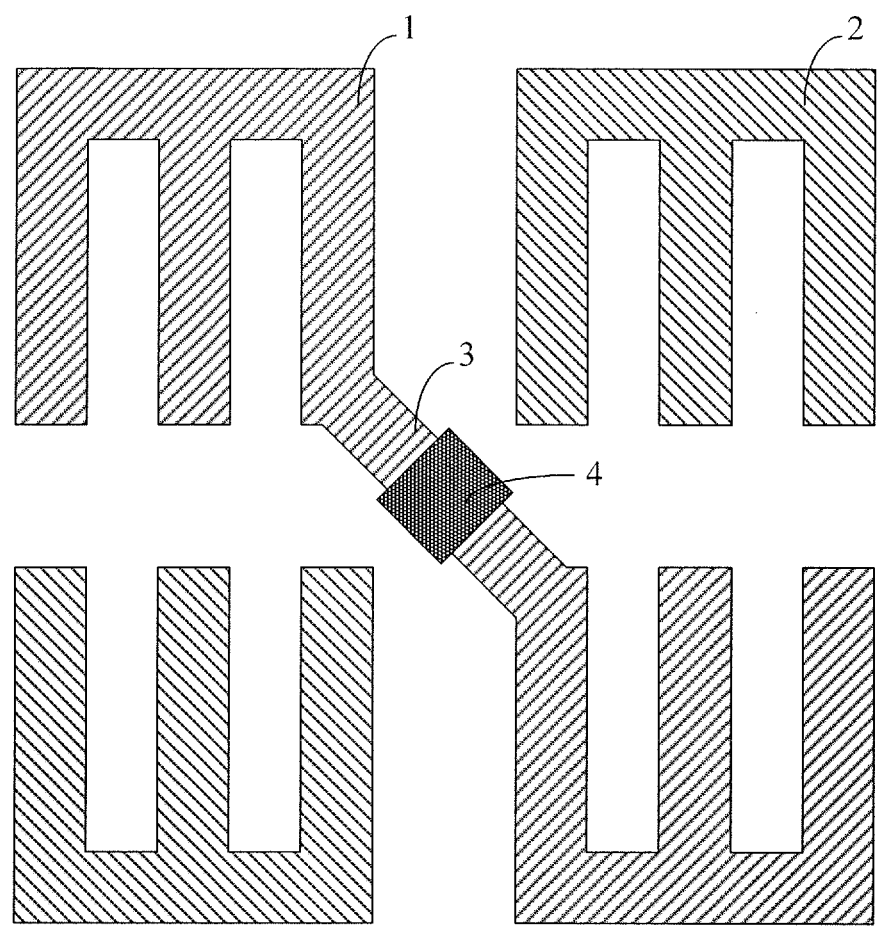
FIG. 2 is a schematic diagram of forming an insulating spacing layer on the basis of FIG. 1.
Figure 3:
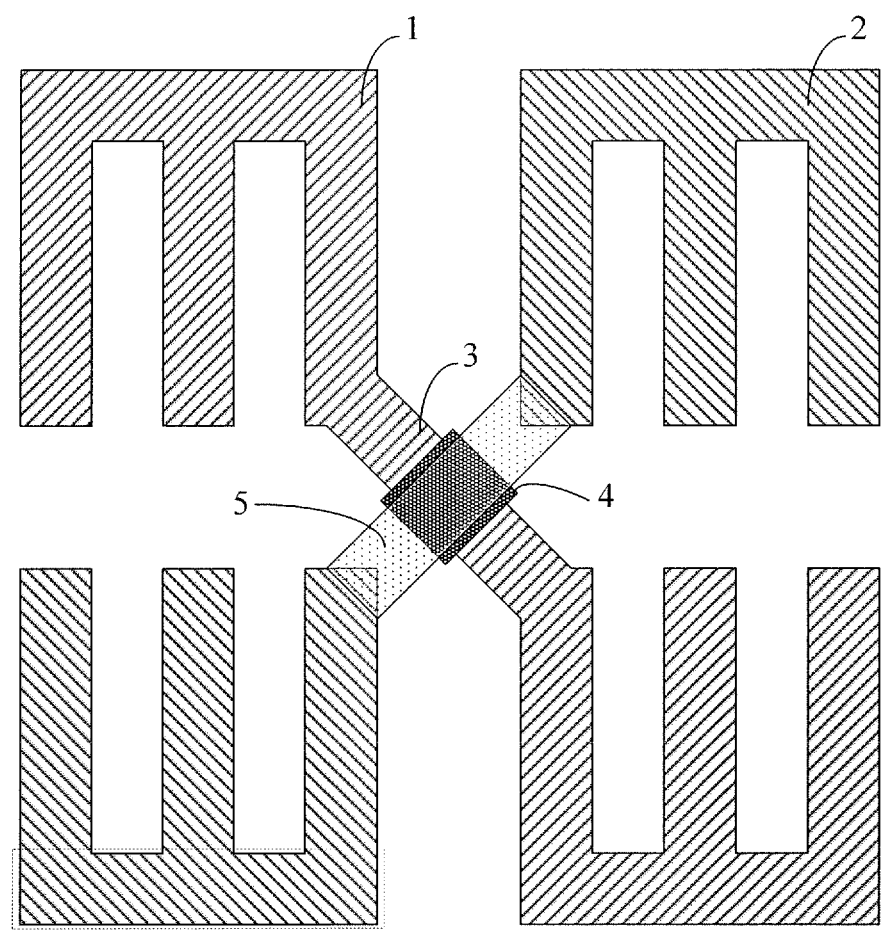
FIG. 3 is a structural schematic diagram of a grating substrate after a second conductive bridge is formed.

Exemplarily, an exemplary description of the fabrication method of the grating substrate is given with reference to FIGS. 1-3; for simplicity, only four touch electrodes are shown in FIGS. 1-3, and more touch electrodes are not shown.

In step 1, as shown in FIG. 1, in order to save the fabrication process, a first conductive bridge 3 is made of the same material with the touch electrode, so while an array of comb-shaped, opaque touch electrodes (including a plurality of first touch electrodes 1 and a plurality of second touch electrodes 2) is formed on the base substrate, the first conductive bridge 3 is formed too, and the first conductive bridge 3 is used to connect a plurality of first touch electrodes 1. The first conductive bridge 3 and the touch electrodes may be fabricated by using a patterning process (the patterning process generally includes coating a photoresist, exposing, developing, etching, removing the photoresist and so on).

As shown in FIG. 2, an insulating spacing layer 4 covering the first conductive bridge 3 may cover the entire base substrate (when it covers the entire base substrate, through holes are formed in regions of the insulating spacing layer corresponding to regions where the second touch electrode and the second conductive bridge are connected), or may only cover a region where the first conductive bridge is formed, or may only cover an overlapping region between the second conductive bridge to be formed and the first conductive bridge. The final grating substrate is shown in FIG. 3, and in the embodiment, the insulating spacing layer 4 is shown to only cover the overlapping region between the second conductive bridge to be formed and the first conductive bridge, to save material.

Exemplarily, when the insulating spacing layer 4 is formed, a layer of photoresist may be formed at first, and the photoresist in the region where the insulating spacing layer 4 is to be formed is removed, then a layer of insulating spacing material is formed, and finally the photoresist is removed, so that the insulating spacing material covered the photoresist is removed altogether, to finally form the insulating spacing layer 4.

In step 3, when a second conductive bridge is formed, a layer of photoresist may be formed at first, and the photoresist in the region where the second conductive bridge is to be formed is removed, then a layer of conductive material (e.g., metal) is formed, and finally the photoresist is removed, so that the conductive material covered the photoresist is removed altogether, to finally form a second conductive bridge 5 to connect with the second touch electrode 2.

Further, after the second conductive bridge 5 is formed, a protective layer may be formed to protect the grating substrate.

Further, the base substrate may be a color filter (CF) substrate, and a plurality of touch electrodes and the first and second conductive bridges may be formed on a side of the base substrate opposite to a color filter, so that no additional grating alignment is needed when the slit grating is attached to the display panel, thus avoiding the alignment deviation. Of course, for One Glass Solution (OGS), they may also be formed inside the protective layer (Cover).

In order not to affect the display effect, further, in each comb-shaped touch electrode, a connection bar for connecting comb teeth (as shown in the dashed line box in FIG. 3) corresponds to a black matrix of the base substrate.

A Second Embodiment

A fabrication method of a grating substrate provided by the present embodiment comprises steps of:

Step 1: forming a second conductive bridge at a predetermined position on a base substrate.

Step 2: forming an insulating spacing layer on the base substrate on which the second conductive bridge is formed, to make the insulating spacing layer cover the second conductive bridge.

Step 3: forming an array of comb-shaped, opaque touch electrodes and a first conductive bridge on the base substrate on which the second conductive bridge and the insulating spacing layer are formed, wherein the array of touch electrodes includes a plurality of first touch electrodes and a plurality of second touch electrodes which are disconnected from each other, and each of the plurality of first touch electrodes and the plurality of second touch electrodes is comb-shaped and opaque, and the plurality of first touch electrodes in the array are connected together via the first conductive bridge, while the plurality of second touch electrodes are connected together via the second conductive bridge, and the insulating spacing layer is arranged between the first conductive bridge and the second conductive bridge.

Exemplarily, when the second conductive bridge is formed, a layer of photoresist may be formed at first, and the photoresist in the region where the second conductive bridge is to be formed is removed, then a layer of conductive material (e.g., metal) is formed, and finally the photoresist is removed, so that the conductive material covered the photoresist is removed altogether, to finally form the second conductive bridge; or a layer of conductive material is formed at first, and then fabrication is performed by a patterning process (the patterning process generally includes coating photoresist, exposing, developing, etching, removing the photoresist and so on).

Exemplarily, the insulating spacing layer covering the second conductive bridge may cover the entire base substrate (when it covers the entire base substrate, through holes are formed in the insulating spacing layer corresponding to regions where the second touch electrode and the second conductive bridge are connected), or may only cover a region where the second conductive bridge is formed, or may only cover an overlapping region between the first conductive bridge to be formed and the second conductive bridge.

Exemplarily, when the array of touch electrodes and the first conductive bridge are formed, in order to save the fabrication process, the first conductive bridge is made of the same material with the touch electrode, so while an array of comb-shaped, opaque touch electrodes (including the first touch electrodes and the second touch electrodes) is formed on the base substrate, the first conductive bridge is formed too, to connect the first touch electrodes. The first conductive bridge 3 and the touch electrodes may be fabricated by a patterning process (the patterning process generally includes coating a photoresist, exposing, developing, etching, removing the photoresist and so on). Meanwhile the second conductive bridge formed in step 1 is used to connect the second touch electrodes of the array together, and the first conductive bridge and the second conductive bridge is spaced by the insulating spacing layer.

Further, after the first conductive bridge is formed, a protection layer may be formed to protect the grating substrate.

Further, the base substrate may be a color filter (CF) substrate, and a plurality of touch electrodes and the first and second conductive bridges may be formed on a side of the base substrate opposite to a color filter, so that no additional grating alignment is needed when the slit grating is attached to the display panel, thus avoiding an alignment deviation. Of course, for One Glass Solution (OGS), they may also be formed inside the protective layer (Cover).

In order not to affect the display effect, further, in each comb-shaped touch electrode, a connection bar for connecting comb teeth is located in a region corresponding to a black matrix of the base substrate.

A Third Embodiment

As shown in FIG. 3, the embodiment of the invention further provides a grating substrate, comprising: a plurality of first conductive bridges, a plurality of comb-shaped, opaque first touch electrodes, and a plurality of comb-shaped, opaque second touch electrodes, formed in a same layer of a base substrate; a plurality of second conductive bridges, configured to connect the plurality of second touch electrodes, wherein the plurality of first touch electrodes are not connected to the plurality of second touch electrodes, and the plurality of first conductive bridges are configured to connect the plurality of first touch electrodes, and an insulating spacing layer is arranged between the first conductive bridges and the second conductive bridges. Each of the first touch electrodes and the second touch electrodes is a comb-shaped electrode.

Exemplarily, the base substrate is a color filter (CF) substrate, or for One Glass Solution (OGS), it may also be formed inside a protection layer (Cover).

Exemplarily, as shown in the dashed line box in FIG. 3, in each comb-shaped electrode, a connection bar for connecting comb teeth is located in a region corresponding to a black matrix of the base substrate.

Exemplarily, the insulating spacing layer is only formed in overlapping regions of the first conductive bridges and the second conductive bridges. Or, the insulating spacing layer covers the entire base substrate, in which a plurality of through holes are formed to connect the plurality of second touch electrodes and the second conductive bridges.

Exemplarily, the plurality of first conductive bridges, the plurality of comb-shaped, opaque first touch electrodes, and the plurality of comb-shaped, opaque second touch electrodes are made from same material.

In the grating substrate provided by the embodiment of the present invention, the touch electrode is an opaque comb-shaped electrode, which can be used as not only a touch electrode of a touch screen but also an electrode of a 3D slit grating, to achieve both a touch function and a 3D light-splitting function at the same time.

An embodiment of the present invention further provides a display device, comprising a display panel and the grating substrate mentioned above disposed on a light outgoing side of the display panel.

Exemplarily, the display panel may be a liquid crystal display panel, including: an array substrate; a color filter substrate, disposed opposite to the array substrate; and a liquid crystal layer, disposed between the array substrate and the color filter substrate, wherein the base substrate of the grating substrate is the color filter substrate, wherein the plurality of touch electrodes and the first and second conductive bridges may be formed on a side of base substrate opposite to a color filter.

Exemplarily, the display panel may be an organic light-emitting display panel, including: an array substrate; an opposed substrate, disposed opposite to the array substrate, wherein the base substrate of the grating substrate is the opposed substrate, wherein the plurality of touch electrodes and the first and second conductive bridges may be formed on a side of the opposed substrate opposite to the array substrate.

Exemplarily, the display device may be: a liquid crystal panel with a 3D display function, an OLED panel, a mobile phone, a tablet computer, a television, a display, a notebook computer, a digital photo frame, a navigator, or any other product or component having a display function.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

The present application claims priority of Chinese Patent Application No. 201410253654.5 filed on Jun. 9, 2014, the disclosure of which is incorporated herein by reference in its entirety as part of the present application.

What is claimed is:

1. A fabrication method of a grating substrate, comprising:
   forming an array of comb-shaped, opaque touch electrodes and a plurality of first conductive bridges on a base substrate, wherein the array of touch electrodes comprises a plurality of first touch electrodes and a plurality of second touch electrodes which are disconnected from each other, and the plurality of first touch electrodes in the array are connected to each other by the first conductive bridges;
   forming an insulating spacing layer on the base substrate on which the array of the touch electrodes and the plurality of first conductive bridges are formed, the insulating spacing layer covering the first conductive bridges; and
   forming second conductive bridges on the insulating spacing layer, the plurality of second touch electrodes in the array being connected to each other by the second conductive bridges;
   wherein the forming an array of comb-shaped, opaque touch electrodes and a plurality of first conductive bridges on a base substrate comprises:
      forming the array of comb-shaped, opaque touch electrodes on the base substrate at the same time of forming the first conductive bridges, to connect the plurality of first touch electrodes in the array; and
   wherein the first conductive bridges are made of the same material with the first touch electrodes and the second touch electrodes.

2. The fabrication method of the grating substrate according to claim 1, wherein the forming an insulating spacing layer on the base substrate on which the array of the touch electrodes and the plurality of first conductive bridges are formed comprises:
forming the insulating spacing layer in overlapping regions between the second conductive bridges and the first conductive bridges.

3. The fabrication method of the grating substrate according to claim 1, wherein the base substrate is a color filter substrate, and in each of the comb-shaped touch electrodes, a connection bar for connecting comb teeth corresponds to a black matrix of the base substrate.

4. The fabrication method of the grating substrate according to claim 1, after forming the second conductive bridges, further comprising: forming a protective layer.

5. The fabrication method of the grating substrate according to claim 1, wherein the forming an insulating spacing layer on the base substrate on which the array of the touch electrodes and the plurality of first conductive bridges are formed comprises: forming the insulating spacing layer on the entire base substrate on which the array of the touch electrodes and the plurality of first conductive bridges are formed.

6. The fabrication method of the grating substrate according to claim 2, wherein the forming the insulating spacing layer in overlapping regions between the second conductive bridges and the first conductive bridges comprises:
coating a photoresist on the base substrate on which the array of the touch electrodes and the plurality of first conductive bridges are formed;
removing the photoresist from the overlapping regions between the second conductive bridges and the first conductive bridges;
then forming a layer of insulating spacing material;
removing the photoresist, to form the insulating spacing layer.

7. The fabrication method of the grating substrate according to claim 1, wherein the forming second conductive bridges on the insulating spacing layer comprises:
forming a layer of photoresist on the insulating spacing layer;
removing the photoresist from regions in which the second conductive bridges are to be formed;
then forming a layer of conductive material;
removing the photoresist, to form the second conductive bridges.

8. A fabrication method of a grating substrate, comprising:
forming second conductive bridges at predetermined positions on a base substrate;
forming an insulating spacing layer on the base substrate on which the second conductive bridges are formed, to make the insulating spacing layer cover the second conductive bridges;
forming an array of comb-shaped, opaque touch electrodes and a plurality of first conductive bridges on the base substrate on which the second conductive bridges and the insulating spacing layer are formed, wherein the array of touch electrodes comprises a plurality of first touch electrodes and a plurality of second touch electrodes which are disconnected from each other, and the plurality of first touch electrodes in the array are connected to each other by the first conductive bridges, while the plurality of second touch electrodes in the array are connected to each other by the second conductive bridges, and the insulating spacing layer is arranged between the first conductive bridges and the second conductive bridges;
wherein the forming an array of comb-shaped, opaque touch electrodes and a plurality of first conductive bridges on the base substrate on which the second conductive bridges and the insulating spacing layer are formed comprises:
forming the array of comb-shaped, opaque touch electrodes on the base substrate at the same time of forming the plurality of first conductive bridges, to connect the plurality of first touch electrodes; and
wherein the first conductive bridges are made of the same material with the first touch electrodes and the second touch electrodes.

9. The fabrication method of the grating substrate according to claim 8, wherein the forming an insulating spacing layer on the base substrate on which the second conductive bridges are formed, to make the insulating spacing layer cover the second conductive bridges comprises:
forming the insulating spacing layer in overlapping regions between the second conductive bridges and the first conductive bridges.

10. The fabrication method of the grating substrate according to claim 8, wherein the base substrate is a color filter substrate, and in each of the comb-shaped touch electrodes, a connection bar for connecting comb teeth corresponds to a black matrix of the base substrate.

11. The fabrication method of the grating substrate according to claim 8, after forming an array of comb-shaped, opaque touch electrodes and the first conductive bridges, further comprising: forming a protective layer.

12. The fabrication method of the grating substrate according to claim 8, wherein the forming an insulating spacing layer on the base substrate on which the second conductive bridges are formed comprises:
forming the insulating spacing layer on the entire base substrate on which the second conductive bridges are formed.

13. The fabrication method of the grating substrate according to claim 9, wherein the forming the insulating spacing layer in overlapping regions between the second conductive bridges and the first conductive bridges comprises:
coating a photoresist on the base substrate on which the second conductive bridges are formed;
removing the photoresist from the overlapping regions between the second conductive bridges and the first conductive bridges;
then forming a layer of insulating spacing material; and
removing the photoresist, to form the insulating spacing layer.

14. A grating substrate, comprising:
a plurality of first conductive bridges, a plurality of comb-shaped, opaque first touch electrodes, and a plurality of comb-shaped, opaque second touch electrodes, formed in a same layer on a base substrate;
a plurality of second conductive bridges, configured to connect the plurality of second touch electrodes,
wherein the plurality of first touch electrodes are not connected to the plurality of second touch electrodes, the plurality of first conductive bridges are configured to connect the plurality of first touch electrodes, and an insulating spacing layer is arranged between the first conductive bridges and the second conductive bridges;
wherein the plurality of first conductive bridges, the plurality of comb-shaped, opaque first touch electrodes, and the plurality of comb-shaped, opaque second touch electrodes are made from a same material.

15. The grating substrate according to claim 14, wherein the base substrate is a color filter substrate, and in each of the comb-shaped touch electrodes, a connection bar for connecting comb teeth corresponds to a black matrix of the base substrate.

16. The grating substrate according to claim 14, wherein the insulating spacing layer is only formed in overlapping regions of the first conductive bridges and the second conductive bridges.

17. The grating substrate according to claim 14, wherein the insulating spacing layer covers the entire base substrate, in which a plurality of through holes are formed to connect the plurality of second touch electrodes and the second conductive bridges.

* * * * *